United States Patent [19]
Nakagawa

[11] Patent Number: 5,887,066
[45] Date of Patent: Mar. 23, 1999

[54] HEADPHONE APPARATUS

[75] Inventor: Noboru Nakagawa, Tokyo, Japan

[73] Assignee: Sony Corporation, Tokyo, Japan

[21] Appl. No.: 7,697

[22] Filed: Jan. 15, 1998

[30] Foreign Application Priority Data

Jan. 20, 1997 [JP] Japan ................................. 9-008082

[51] Int. Cl.$^6$ .................................................. H04R 1/10
[52] U.S. Cl. .......................... 381/311; 381/74; 381/309
[58] Field of Search ................................ 381/1, 300, 309, 381/311, 74, 77

[56] References Cited

U.S. PATENT DOCUMENTS

| | | | |
|---|---|---|---|
| 4,845,751 | 7/1989 | Schwab | 381/311 |
| 5,247,293 | 9/1993 | Nakagawa | 381/311 |
| 5,361,381 | 11/1994 | Short | 381/80 |

*Primary Examiner*—Minsun Oh Harvey
*Attorney, Agent, or Firm*—Jay H. Maioli

[57] ABSTRACT

A headphone apparatus includes a plurality of antennas for receiving an FM signal produced by FM-modulating a carrier signal with an audio signal, a plurality of tuning circuits for receiving reception signals of the plurality of antennas, a mixer circuit for causing tuning coils of the tuning circuits to be transformer-coupled to each other and for frequency-converting an output signal of one tuning circuit into an intermediate frequency signal, an FM demodulating circuit for FM-demodulating the intermediate frequency signal to produce the audio signal, and an acoustic unit for converting this audio signal into a sound. The directivity axes of the antennas are arranged perpendicularly thereby improving the reception of this headphone apparatus.

5 Claims, 7 Drawing Sheets

5,887,066

HEADPHONE APPARATUS

BACKGROUND OF THE INVENTION

The present invention is related to a cordless headphone.

As a headphone stereophonic system, for instance, a cassette tape player is connected with a headphone by way of a cordless manner.

FIG. 1 is a perspective view for illustrating an outer view of one typical cordless type cassette tape player. In this drawing, reference numeral 1 shows a cassette tape player, and reference numeral 6 indicates a receiver exclusively used for this headphone.

Then, in the cassette tape player 1, an audio signal "R" of a right channel and an audio signal "L" of a left channel are reproduced from a cassette tape (not shown) in a stereophonic system during the reproducing operation. These right/left channel signals R/L are converted into FM signals SR/SL having preselected carrier frequencies, and then these FM signals SR/SL are transmitted to the receiver 6.

Then, in the receiver 6, when the FM signals SR and SL transmitted from the cassette tape player 1 are received, audio signals R and L are demodulated from these FM signals SR and SL, and then these audio signals R/L are supplied via a headphone cord 7C to right/left acoustic units 7R/7L of a headphone 7 so as to be converted into stereophonically reproduced sounds.

It should be noted that the distance over which the receiver 6 may be separated from the cassette tape player 1 during the stereophonic operation is within a range from 1 m to 3 m, for example, approximately 1.5 m.

FIG. 2 and FIG. 3 represents one example of signal processing systems for the above-described cordless type cassette tape player 1 and receiver 6. In the cassette tape player 1, the right/left-channel audio signals R/L are reproduced from a magnetic tape 2 of the tape cassette by reproducing heads 11L/11R during the reproducing operation. These audio signals R/L are supplied via reproducing equalizer amplifiers 12R/12L and preemphasis circuits 13R/13L to FM modulating circuits 14R/14L so as to be converted into FM signals SRT/SLT.

In this case, the carrier frequencies fRT/fLT of the FM signals SRT/SLT are selected to be, for example, $$fLT=11.29 \text{ MHz}$$

$$fRT=11.75 \text{ MHz}.$$

Then, these FM signals SRT and SLT are supplied to a mixer circuit 15, and an oscillation signal S16 having a preselected stable frequency f16 (for instance, f16=249.75 MHz) is produced from an oscillating circuit 16. This oscillation signal S16 is supplied to the mixer circuit 15.

Thus, the FM signals SRT and SLT are added to each other in the mixer circuit 15, and then the added signal is frequency-converted by the oscillation signal S16. As a result, these FM signals SRT/SLT are frequency-converted into such FM signals SR/SL having the following carrier frequencies fR/fL:

$$fL=f16-fLT=238.46 \text{ MHz}$$

$$fR=f16-fRL=238.0 \text{ MHz}.$$

Then, these FM signals SR and SL are supplied via a bandpass filter 17 and an output amplifier 18 to a transmitter antenna 19 in order to be transmitted to the receiver 6.

On the other hand, in the receiver 6, the FM signals SR/SL transmitted from the cassette tape player 1 are received by the headphone cord 7C (namely, headphone cord 7C may be operated as an antenna), the received FM signals SR/SL are supplied via a bandpass filter 61 and a RF (radio frequency) amplifier 62 to a mixer circuit 63, and also a local oscillation signal S64 is supplied from a local oscillating circuit 64.

In this case, it should be understood that the frequency f64 of the local oscillation signal S64 is selected to be, for instance, $$f64=248.7 \text{ MHz}.$$

In this manner, these FM signals SR and SL are frequency-converted by the mixer circuit 63 by using the local oscillation signal S64 into intermediate frequency signals SRI and SLI having frequencies fRI and fLI given as, for instance, $$fLI=fL-f64=10.24 \text{ MHz},$$

$$fRI=fR-f64=10.7 \text{ MHz}.$$

Then, these intermediate frequency signals SRI and SLI are supplied via intermediate frequency circuits 65R and 65L containing filters and limiter amplifiers to FM demodulating circuits 66R and 66L, respectively, so as to demodulate audio signals R and L. These audio signals R/L are supplied to the "hot" sides of the acoustic units 7R and 7L via a signal line constituted by deemphasis circuits 67R/67L, output amplifiers 68R/68L, and RF choke coils 69R/69L. Also, at this time, the "cold" sides of the acoustic units 7R and 7L are connected through another RF choke coil 69G to the ground.

As a consequence, the audio signals R and L reproduced by the cassette tape player 1 can be heard by the headphone 7.

In this case, the dimension of the receiver 6 may be defined by, for instance, 50 mm (height)×20 mm (width)×10 mm (thickness). When the cassette tape music is played, since the cassette tape player 1 is connected to the receiver 6 in the cordless manner, while this cassette tape player 1 is stored in a bag, the receiver 6 may be put into a chest pocket of a jacket for example. Therefore, when the tape music is reproduced while the user goes to his office, or the user walks, there is no cord connected between the cassette tape player 1 and the receiver 6 to disturb the user operation.

Also, since the carrier frequencies fR/fL of the FM signals SR/SL transmitted from the cassette tape player 1 to the receiver 6 are selected to be, for example, fL=238.46 MHz and fR=238.0 MHz, namely higher than the frequency bands from 76 MHz to 222 MHz generally used in the FM broadcasting system and the television broadcasting system, these FM stereophonic signals SR/SL will not be adversely influenced by electromagnetic wave interference from broadcasting electromagnetic waves or reflections from surfaces in cities.

In the above-described cordless type headphone stereophonic system, the connection between the cassette tape player 1 and the exclusively used receiver 6 is made as a "cordless" connection, whereas the connection between the headphone 7 and this receiver 6 is not made as the "cordless" connection, but is established by the headphone cord 7C.

Therefore, it is conceivable to assemble the receiver 6 with the headphone 7 so as to eliminate the necessity of the headphone cord 7C. However, if so, then this headphone cord 7C can be no longer used as the reception antenna when the receiver 6 receives the FM signals SR and SL. Accordingly, another reception antenna must be employed.

As a result, for instance, as represented in FIG. 4, or FIG. 5, in order to obtain a high signal reception sensitivity, it is also conceivable to design this receiver 6 as a diversity reception system. In other words, in the receiver 6 shown in FIG. 4, the FM signals SR/SL are received by two sets of antennas 7A/7B and two sets of signal receiving circuits 6A/6B to derive two sets of audio signals R/L. These two audio signals R/L are supplied to a switch circuit 81. Also, reception levels of the receiving circuits 6A and 6B are detected by a detecting circuit 82 to output detection signals. A switch circuit 81 is controlled based on the detection signals.

In this manner, either the audio signal R, or the audio signal L, which is derived from the receiving circuit having the high reception level, is selected and derived from the switch circuit 7 among two sets of the audio signals R and L from the receiving circuits 6A and 6B. As a consequence, the better audio signals R and L can be continuously obtained irrespective of to the directional relationship between the cassette tape player 1 and the receiver 6.

Also, in the receiver 6 shown in FIG. 5, both the reception signal of the antenna 7A and the reception signal of the antenna 7B are switched at a frequency more than two times higher than the maximum frequencies of the audio signals R and L by a oscillation signal derived from an oscillating circuit 84, and then the switched reception signal is supplied to the receiving circuit 6A.

As a result, even when the level of one of the FM signals SR/SL received by the antenna 7A or the antenna 7B is low, if the level of the other FM signal is sufficiently high, then the better audio signals R/L can be produced from the FM signal received by the other antenna.

As previously explained, in accordance with the diversity reception type receiver 6, since the audio signals R/L produced from such an FM signal having the higher reception level among two sets of the FM signals SR/SL is used, the audio signals R/L can be obtained under better condition to reproduce better stereophonic sounds.

However, in the case of the diversity reception type receiver shown in FIG. 4, since a total number of circuit components is greatly increased, higher cost would be required. Also, since the total number of circuit components is increased, when this receiver 6 is assembled with the headphone 7 in an integral manner, the dimension of the headphone 7 would be increased, and further the weight of this headphone 7 would increase, which could impede the easy operation of the headphone.

On the other hand, in the diversity reception type receiver shown in FIG. 5, both the cost and the dimension of this receiver are not greatly increased, as compared with those of the diversity reception type receiver indicated in FIG. 4. However, since the audio signals R/L are partially derived from the FM signals SR/SL having the low reception levels, the S/N ratio and the clarity of the audio signals R/L supplied to the headphone 7 would be deteriorated.

SUMMARY OF THE INVENTION

The present invention has been made to solve the above-described problems, and therefore has an object to provide a cordless headphone capable of realizing a so-called "cordless connection" between a signal receiving circuit and an acoustic unit.

To achieve this object, a headphone, according to the present invention, is featured by comprising:

a first antenna for receiving an FM signal produced by FM-modulating a carrier signal by an audio signal;

a second antenna for receiving the FM signal;

a first tuning circuit to which the reception signal of the first antenna is supplied;

a second tuning circuit to which the reception signal of the second antenna is supplied, including a tuning coil which is transformer-coupled with tuning coil of the first tuning circuit;

a mixer circuit for frequency-converting the output signal of the second tuning circuit into an intermediate frequency signal;

an FM demodulating circuit for FM-demodulating the intermediate signal to obtain the audio signal; and an acoustic unit for entering therein the audio signal derived from the FM demodulating circuit and for converting this entered audio signal into a reproduction sound.

As a consequence, the connection between the signal receiving circuit and the acoustic unit can be made by a so-called "cordless" connection.

BRIEF DESCRIPTION OF THE DRAWINGS

For a better understanding of the present invention, reference is made of a detailed description to be read in conjunction with the accompanying drawings, in which.

DETAILED DESCRIPTION OF THE PREFERRED EMBODIMENTS

Referring now to drawings, a cordless headphone apparatus according to a preferred embodiment of the present invention will be described.

Figure 6:
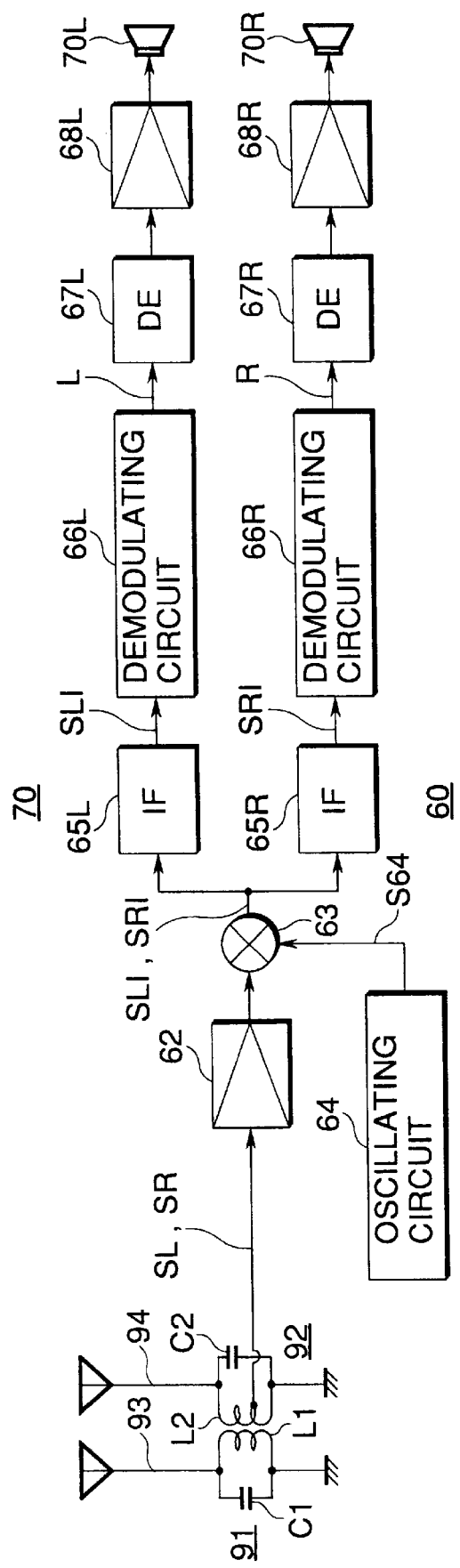
FIG. 6 is a schematic block diagram showing circuit arrangement of a headphone/signal receiving circuit according to an embodiment of the present invention.

FIG. 6 schematically shows a circuit arrangement of a headphone/signal receiving circuit 70 of a cordless headphone apparatus according to an embodiment of the present invention. In this drawing, a tuning coil L1 is connected in parallel to a tuning capacitor C1, so that a first tuning circuit 91 is constituted. Also, another tuning coil L2 is connected in parallel to another tuning capacitor C2, so that a second tuning circuit 92 is constituted. At this time, the coil L1 is positioned close to the coil L2 to thereby establish transformer coupling (mutual inductive coupling).

Also, a first antenna 93 and a second antenna 94 are employed, the first tuning circuit 91 is connected to both the first antenna 93 and the ground, and also the second tuning circuit 92 is connected to both the second antenna 94 and the ground. Furthermore, a center tap of the coil L2 is connected to an input terminal of an amplifier 62.

Figure 3:
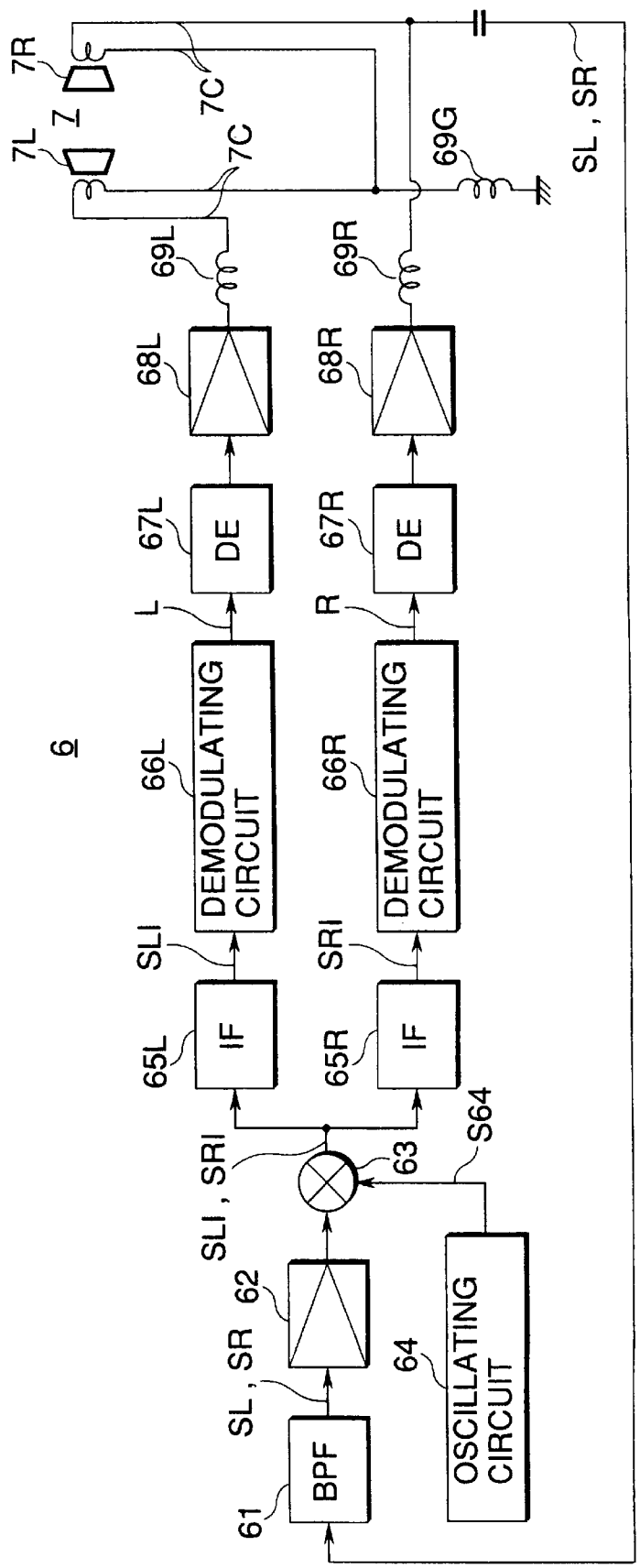
FIG. 3 is a schematic block diagram for indicating the signal processing arrangement of the receiver shown in FIG. 1.

Then, a signal line from this amplifier 62 to amplifiers 68R and 68L is arranged in a similar manner as previously explained in FIG. 3, so that a signal receiving circuit 60 is arranged. Audio signals R and L outputted from the amplifiers 68R and 68L are supplied to a right-channel acoustic unit 70R and a left-channel acoustic unit 70L.

Figure 7:
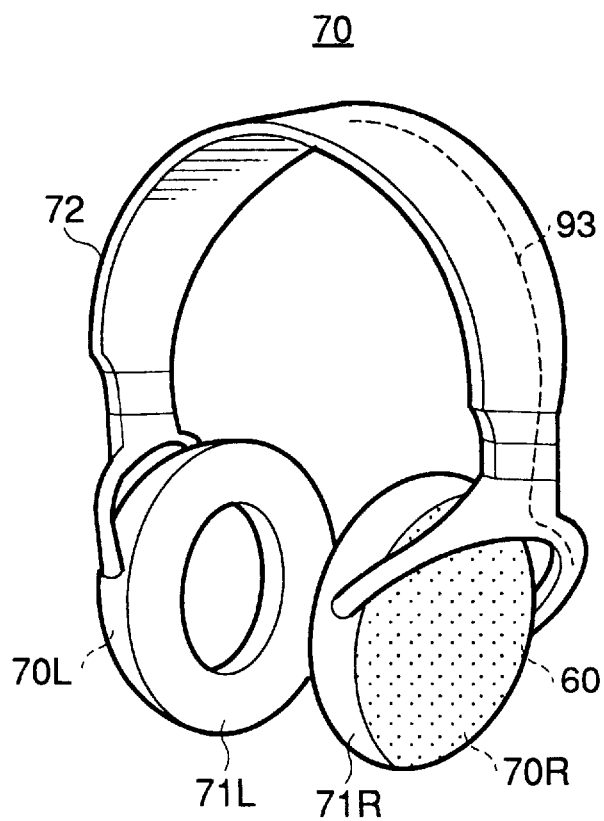
FIG. 7 is a perspective view for representing a headphone apparatus according to the embodiment of the present invention.

In this case, a headphone 70 is constructed of as a head mount type, as illustrated in FIG. 7. That is, the right-channel/left-channel acoustic units 70R/70L are stored inside housings 71R/71L, respectively. Also, these housings 71R and 71L are coupled to each other by way of a band 72, so that the entire headphone 70 may be put on a head of a user to cover his head. The signal receiving circuit 60 is stored inside the housing 71R.

Figure 8:
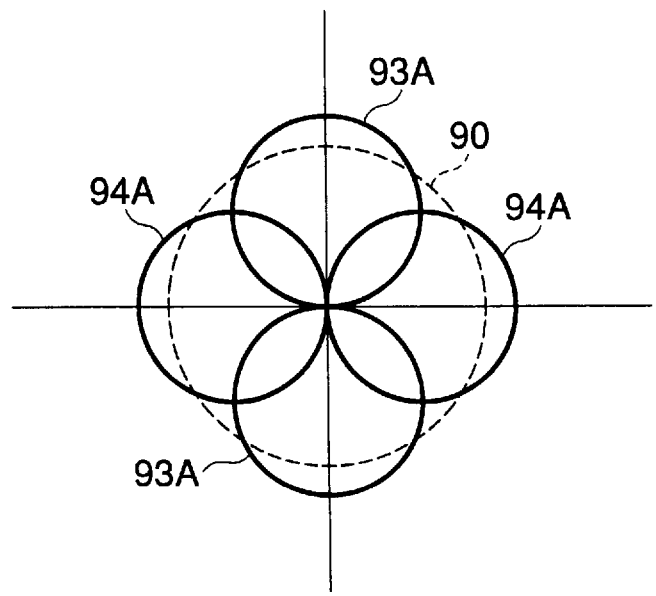
FIG. 8 graphically represents directivity of an antenna employed in the signal receiving circuit of FIG. 6.

When the first antenna 93 and the second antenna 94 have directivities, the directivity directions (namely, directions of directivity axes) may be directed perpendicular to each other. For instance, as represented in FIG. 8, when the first and second antennas 93 and 94 have hyperbolic directivity, these first and second antennas 93 and 94 are arranged in such a manner that the directivity (characteristic curve 93A) of the first antenna 93 is positioned perpendicular to the directivity (characteristic curve 94A) of the second antenna 94. For example, the first antenna 93 is made of a coated wire to construct a lead antenna. This lead antenna 93 is provided, for example, from the housing 71R through a band 72 which connects/holds this housing 71R to the housing 71L. It should be noted that since the frequencies fR and fL of the FM signals SR and SL are approximately 240 MHz and the ¼-wavelengths thereof are approximately 31 cm, when the lead antenna 93 is positioned along the band 72, a tip portion of this lead antenna 93 conducted from the housing 71R may reach the housing 71L.

Also, the second antenna 94 may be made of a helical antenna. Then, since the frequencies fR and fL of the FM signals SR and SL are the above-explained values, the dimension of this helical antenna 94 is selected to be 3 mm (diameter)×40 mm (length), and is stored inside the housing 71R. A portion of this helical antenna 94 is projected outside the housing 71 R, if required. In this case, the first antenna 93 is the lead antenna, and may be regarded as a single upright rod antenna which has a directivity characteristic approximated to the hyperbolic directivity characteristic shown in FIG. 8. Then, the helical antenna 94 is provided within the housing 71R in such a manner that the directivity direction (characteristic curve 94A) of this antenna 94 is positioned perpendicular to that of the lead antenna 93.

Furthermore, although not shown in the drawing, the power supply of the signal receiving circuit 60 may be constituted by, for example, two sets of cells (Japanese unit size No. 3). The respective cells are provided in the housing 71R and 71L in order to establish weight balance of the headphone 70. A wiring line for connecting the housing 71R with the housing 71L is provided along the band 72 and inside this band 72.

With employment of such a structure, the FM signals SR and SL produced from the cassette tape player 1 are received by the first antenna 93 and also by the second antenna 94. These received FM signals SR and SL are supplied via the amplifier 62 to the circuit at the post stage. As a consequence, as previously explained, the audio signals R and L are obtained from the amplifiers 68R and 68L, and then these audio signals R/L are supplied to the acoustic units 70R/70L, so that the user can hear the stereophonic-reproduced sounds.

In this case, since the signal receiving circuit 60 is assembled inside the housing 71R of the headphone 70, no connection cord is required between the signal receiving circuit 60 and the headphone 70.

At this time, since the coil L1 is transformer-coupled with the coil L2, there are phase differences of 90 degrees between the FM signals SR/SL received by the first antenna 93 and the FM signals SR/SL received by the second antenna 94 among the FM signals SR/SL supplied to the amplifier 62. As a results, the FM signals SR and SL received by the antennas 93 and 94 function as circular polarized waves, in appearance. The overall directivities of the first and second antennas 93 and 94 represent omnidirectional (non-directional) directivities, as indicated by a characteristic curve 90 in FIG. 8.

As a consequence, even when there is a changing directional relationship between the cassette tape player 1 and the antennas 93, 94 (headphone 70), the FM signals SR and SL can be continuously received under normal conditions, and therefore the audio signals R/L can be obtained under stable conditions.

Figure 1:
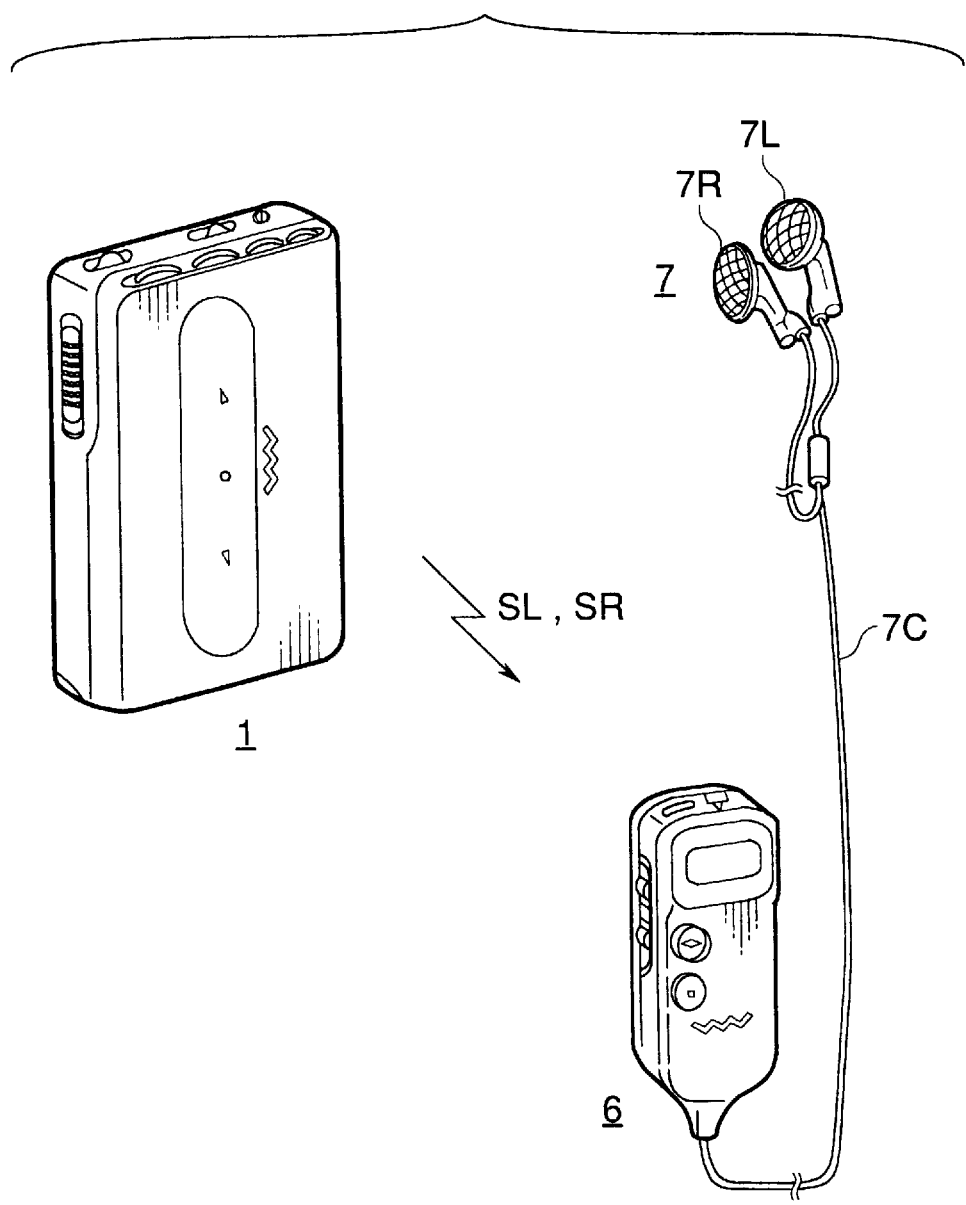
FIG. 1 is a perspective view for showing a typical cordless type cassette tape player.
Figure 2:
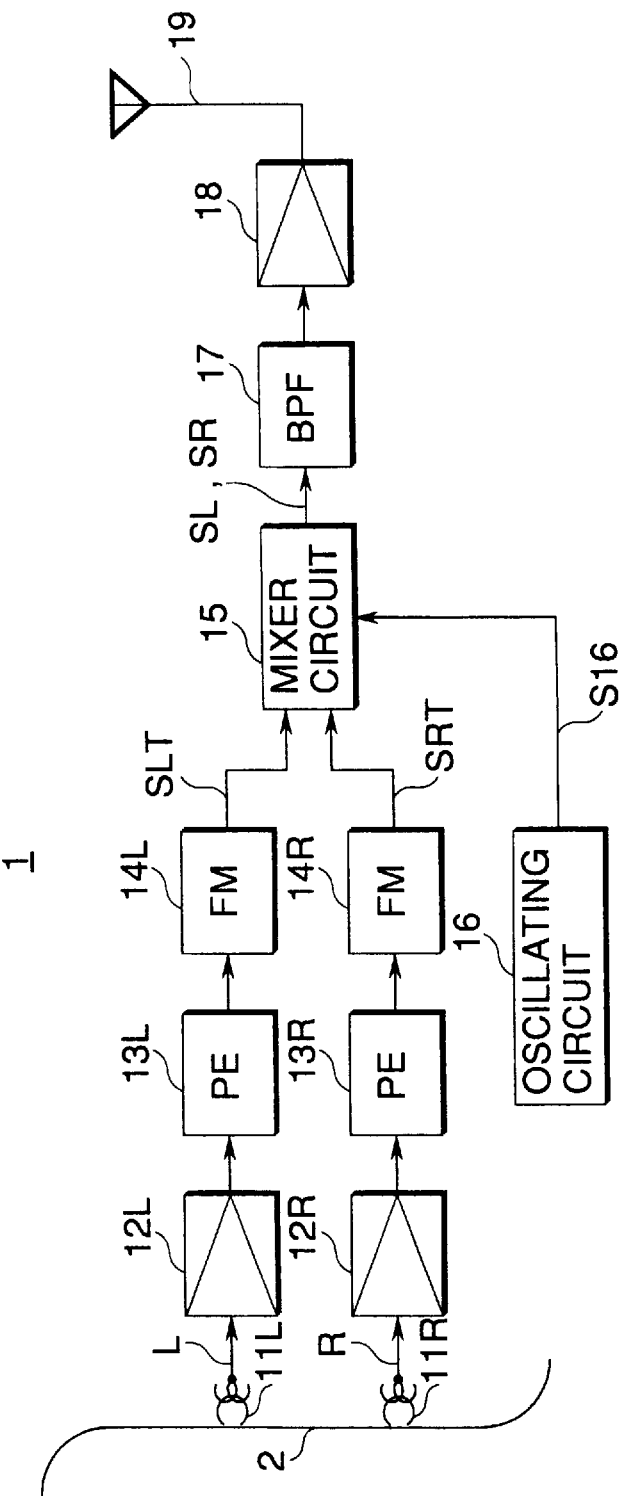
FIG. 2 is a schematic block diagram for representing the signal processing arrangement of the cassette tape player shown in FIG. 1.

As previously explained, in accordance with this headphone 70, since the receiver is connected with the headphone in a so-called "cordless manner", more easy manipulation of this headphone apparatus can be realized, as compared with the conventional headphone apparatus which requires a wire connecting with the receiver 6 as indicated in FIG. 1.

Moreover, in this case, since the first and second antennas 93 and 94 equivalently have omnidirectional directivity characteristics, the reproduced sounds are not adversely influenced by the directional relationship between the cassette tape player 1 and the antennas 93 and 94, the reproduced sounds with higher quality can be continuously obtained.

Figure 4:
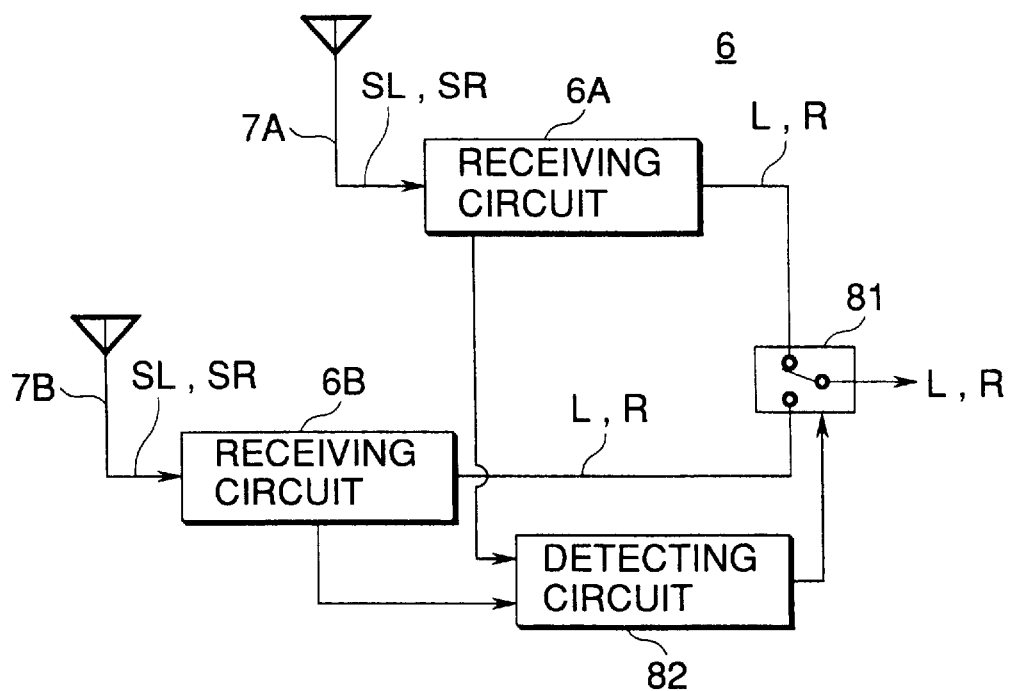
FIG. 4 is a schematic block diagram for showing the signal processing circuit of a diversity reception type receiver.
Figure 5:
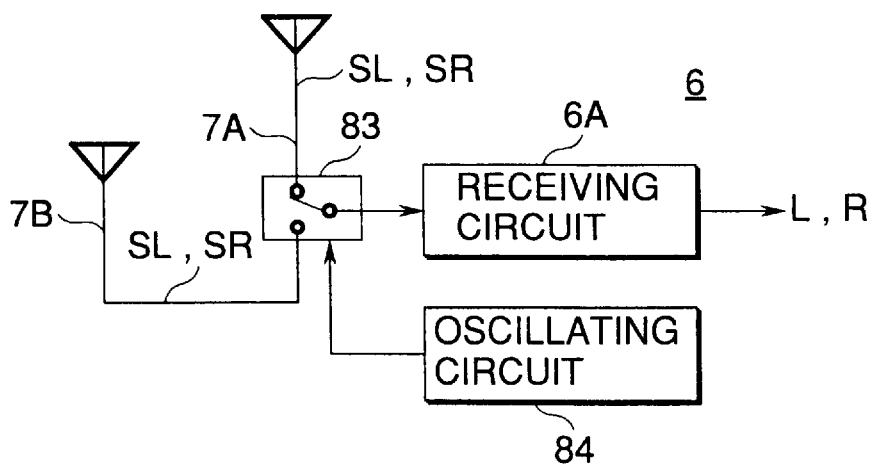
FIG. 5 is a schematic block diagram for representing the signal processing circuit of another diversity reception type receiver.

Also, in order that the omnidirectional directivity characteristics can be achieved, only two sets of first/second tuning circuits 91/92 and two sets of first/second antennas 93/94 are employed. One set of these circuit elements was originally required in this cordless headphone apparatus. Therefore, increasing of the cost is low. In particular, this cost increasing is very low, as compared with that of the diversity reception type headphone apparatuses shown in FIG. 4 and FIG. 5. Furthermore, there is no specific problem in view of the dimension and the weight of the cordless headphone apparatus according to this embodiment mode. Also, the S/N ratio and the clarity of the audio signals R/L are not lowered, which are conversely lowered in the diversity reception type headphone apparatus of FIG. 5.

Figure 9:
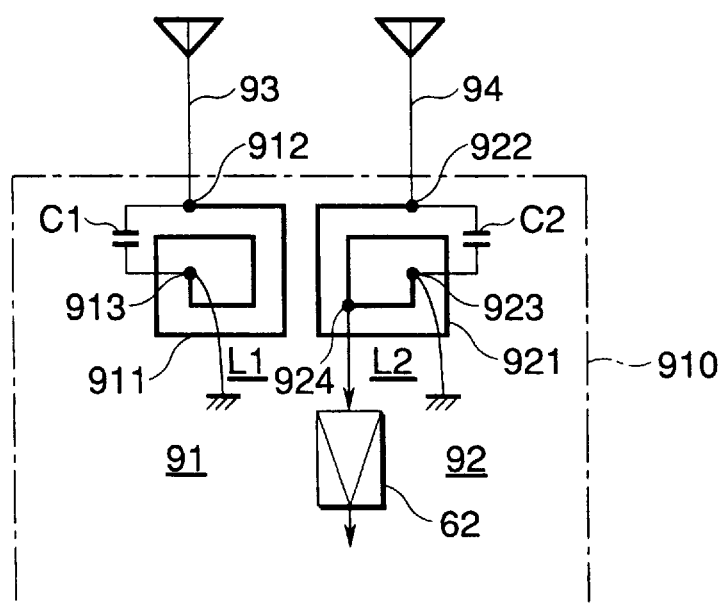
FIG. 9 schematically shows one example of tuning circuits employed in the signal receiving circuit of FIG. 6.

FIG. 9 indicates an example of the tuning circuits 91 and 92. In this example, the tuning coils L1 and L2 of the tuning circuits 91 and 92 are constructed of a printed circuit board. In other words, a printed circuit pattern 911 is formed in a rectangular helical shape, and lands 912 and 913 are formed on both ends of this printed circuit pattern 911 on an insulating board 910, so that the tuning coil L1 is fabricated.

Then, a capacitor C1 is soldered between the land 912 and the land 913 to thereby constitute the tuning circuit 91, and further the land 911 is connected to the antenna 93 whereas the land 912 is connected via a through hole to a ground pattern formed on a reverse surface of the insulating substrate 910.

Furthermore, another printed circuit pattern 921 is formed in a rectangular helical shape and positioned close to the printed circuit pattern 911, and lands 922 and 923 are formed on both ends of this printed circuit pattern 921 on the insulating substrate 910, so that the tuning coil L2 is fabricated. Then, a capacitor C2 is soldered between the land 922 and the land 923 to thereby constitute the tuning circuit 92.

Then, the land 922 is connected to the antenna 94 whereas the land 922 is connected via a through hole to the ground pattern formed on the reverse surface of the insulating board 910. Furthermore, a center tap 924 of the pattern 921 is connected via a through hole and a pattern formed on the reverse surface of the insulating board 910 to an input terminal of an amplifier 62. Although not shown in this drawing, the remaining circuit of the signal receiving circuit 60 is mounted on the insulating board 910.

As a consequence, the coils L1 and L2 can be formed in a simple manner and in low cost, and the stable coils with less fluctuations can be made.

It should be understood that the total turn numbers of the above-described coils L1 and L2 may be increased and the antennas 93 and 94 may be omitted in the above-described embodiment. Accordingly, these coils L1 and L2 may be alternatively operated as loop antennas. The above-explained embodiment is directed to such a case that the signal source of the audio signals R and L is the headphone type stereophonic cassette tape player 1. Alternatively, cordless microphones and other cordless type audio appliances with using CD, MD, DAT and DCC as recording media may be employed.

As previously described in detail, according to the present invention, the headphone apparatus can be made in the completely cordless mode with respect to the audio appliance such as the cassette tape player, and therefore, this headphone apparatus can be operated very easily, as compared with the conventional headphone apparatus which requires the exclusively used receiver as shown in FIG. 1. Moreover, in this case, the reproduced sounds are not adversely influenced by the directional relationship between this headphone apparatus and the audio appliance, but the reproduced sounds with the high quality can always be obtained.

Also, only two sets of the tuning circuits and two sets of the antennas are merely employed. In addition, one set of these circuit elements are originally required by the known cordless headphone apparatus. Therefore, increasing of the cost is low. In particular, this cost increasing is very low, as compared with that of other diversity reception type headphone apparatuses. Furthermore, there is no specific problem in view of the dimension and the weight of the cordless headphone apparatus according to this embodiment mode. Also, the S/N ratio and the clarity of the audio signals R/L are not lowered.

What is claimed is:

1. A cordless headphone apparatus comprising:

a plurality of antennas for receiving an FM signal produced by FM-modulating a carrier signal with an audio signal;

a plurality of tuning circuits connected to said plurality of respective antennas for receiving therein reception signals of said plurality of respective antennas, a pair of said tuning circuits including respective first and second tuning coils, said second tuning coil being transformer-coupled with said first tuning coil, and an output signal of said pair of tuning circuits being tapped from said second tuning coil;

a mixer circuit for frequency-converting said output signal of said pair of tuning circuits tapped from said second tuning coil into an intermediate frequency signal;

an FM demodulating circuit for FM-demodulating said intermediated frequency signal to produce said audio signal; and an acoustic unit for receiving the audio signal derived from said FM demodulating circuit and for converting the audio signal into a sound.

2. A cordless headphone comprising:

a first antenna for receiving an FM signal produced by FM-modulating a carrier signal with an audio signal;

a second antenna for receiving the FM signal;

a first tuning circuit to which the received FM signal of said first antenna is supplied, said first tuning circuit including a first tuning coil;

a second tuning circuit to which the received FM signal of said second antenna is supplied, said second tuning circuit including a second tuning coil, and said second tuning coil being transformer-coupled with said first tuning coil of said first tuning circuit;

a mixer circuit for frequency-converting an output signal of said second tuning circuit tapped from said second tuning coil into an intermediate frequency signal;

an FM demodulating circuit for FM-demodulating the intermediate frequency signal to obtain the audio signal; and an acoustic unit for receiving the audio signal derived from the FM demodulating circuit and for converting the received audio signal into a reproduction sound.

3. The headphone as claimed in claim 2 wherein:

said audio signal corresponds to right/left-channel audio signals in a sterephonic system;

said acoustic unit corresponds to right and left channel acoustic units for converting said right/left-channel audio signals into corresponding right and left components of said reproduced sound; and said first tuning circuit, said second tuning circuit, said mixer circuit, and said FM demodulating circuit are stored into a first housing for containing one of said right and left channel acoustic units, the other of said right and left channel units being contained in a second housing; and said first housing is coupled to said second housing by way of a band, wherein said first and second housing units and said band constitute a head mount type headphone.

4. The headphone as claimed in claim 2 wherein:

said first and second antennas are arranged in such a manner that a directivity axis of said first antenna is different from a directivity axis of said second antenna.

5. The headphone as claimed in claim 4 wherein:

said first and second antennas are arranged in such a manner that the directivity axis of said first antenna is substantially perpendicular to the directivity axis of said second antenna.

* * * * *